United States Patent [19]
Sheasby et al.

[11] Patent Number: 5,999,190
[45] Date of Patent: Dec. 7, 1999

[54] COMPUTER IMAGING USING GRAPHICS COMPONENTS

[75] Inventors: Michael C. Sheasby, Longueuil; Thomas Krul, Ottawa, both of Canada; Craig S. Murphy, Kirkland, Wash.

[73] Assignee: Avid Technology, Inc., Tewksbury, Mass.

[21] Appl. No.: 08/872,902

[22] Filed: Jun. 11, 1997

Related U.S. Application Data

[60] Provisional application No. 60/042,936, Apr. 4, 1997.

[51] Int. Cl.[6] .................................................... G06F 15/00
[52] U.S. Cl. ............................................................ 345/431
[58] Field of Search ................................... 345/430, 431, 345/470, 471, 150, 151, 152

[56] References Cited

U.S. PATENT DOCUMENTS 5,596,686  1/1997  Duluk, Jr. ............................. 345/422

OTHER PUBLICATIONS

Fractual Design—Painter 4, copyright 1995, pp. 94–294.
Soft Image—Eddie, 39 pages (2 pages per sheet), 1996.
Adobe—Adobe Photoshop 4.0, copyright 1991, 1993, 1994, 1996, pp. 143–296.

*Primary Examiner*—Phu K. Nguyen

[57] ABSTRACT

Graphics software for use in rendering an image on a computer display. The software is used in conjunction with special hardware including a high resolution computer monitor and high speed graphics imaging software. The software allows the user to create and manipulate paint objects that define the way images are modified by rendering tools such as a drawing tool or a titling tool. The attributes for a plurality of paint objects are defined in a hierarchy and can be stored on a memory device such as a computer hard drive. The organization into a hierarchy of the various attributes making up a complex object such as a paint stroke or a text body result in an ability to deal with branches of the hierarchy as persistable objects in their own right.

21 Claims, 9 Drawing Sheets

COMPUTER IMAGING USING GRAPHICS COMPONENTS

CROSS REFERENCE TO RELATED APPLICATION

The present application claims priority of United States Provisional patent application Ser. No. 60/042,936 filed Apr. 4, 1997.

FIELD OF THE INVENTION

The present invention relates to paint programs generally and more particularly relates to method and apparatus for controlling a style of rendering text and/or graphics images on a computer screen.

BACKGROUND ART

Computer software is routinely used to depict graphic images on a computer display. Graphics software that is meant to run in conjunction with a 'windows' based operating system must be able to make use of the graphics capabilities of the operating system, i.e. the software must understand about brushes, pens, colors etc. Special graphics processors and higher speed general purpose processors used in conjunction graphics software and large, high resolution monitors have improved the ability to display graphics and text images on a computer screen.

Graphics software packages are commercially available from a number of software vendors that run on various hardware configurations. The availability of reduced cost, more powerful processors has allowed paint and 3-D modeling systems to be made available for use on personal computers, and high speed workstations. Typical uses of the software running on this configuration of hardware is for video editing and computer animation.

Prior art computer graphics software is commercially available from SoftImage of Montreal, Canada. This software includes a paint capability wherein the user can define a brush that will be used in rendering images on the computer display. As with most computer graphics programs, existing graphics computer programs can also display text using a particular style of text where the style includes the font of the text as well as the size, color etc.

When using the prior art graphics software it was not possible to easily save all the components or attributes that combine to define brush strokes or text rendering. In order for a paint or titling artist to produce a stroke or character with a particular or specific look, he or she must set up many individual parameters. The user must define a specific brush shape, size, profile, specific color, opacity, tool shape etc. Once a parameter or tool has been changed, prior art software would not allow the user to simply retrieve the discrete settings or parameters which made up the original 'style' of the previous image rendering.

SUMMARY OF THE INVENTION

The present invention concerns method and apparatus for rendering images on a computer display and more particularly concerns imaging components or objects that form a paint tool.

One embodiment of the present invention concerns a method for controlling a rendering of images on a computer display. One or more image rendering or painting tools are organized or defined as a plurality of tool components that define a manner in which a rendering tool paints an image on the computer display. At least some of the tool components are made up of multiple tool subcomponents that define an associated tool component and thereby define a hierarchy of components that characterize the paint tool.

A number of paint tools, tool components and tool subcomponents are preferably stored in a memory as presets for selective retrieval of various combinations of the stored paint tools, stored tool components and stored tool subcomponents. Defining the paint tool as a hierarchy of components and subcomponents allows the user great flexibility in storing and retrieving presets at different levels of the paint tool hierarchy. For example, when working with text, the user can define a text tool as including text components, font components, font effect subcomponents such as shading, or any desired combination of these elements. The entire tool can be stored as a preset that includes many components that previously achieved a desired result and which the user wishes to utilize again without the work involved in initially creating those components.

Most preferably the user is presented with a hierarchical arrangement of components and subcomponents that make up a paint tool on the computer display. In accordance with the preferred embodiment of the invention the hierarchy is in the form of a tree having branches for components with subcomponents and leaves for components without subcomponents. By selecting a tool, component or subcomponent an editor is launched for the selected tool, component or subcomponent that allows the user to redefine the parameters of the selected tool, component, or subcomponent. It is also possible to select one of the components of the tree and load a predefined set of data for that component.

These features result in a number of advantages to the user. Entire hierarchies of component parameters can be quickly loaded from memory and used in subsequent image rendering or painting. Sections of the hierarchy can be stored as objects and retrieved for grafting without disrupting other parts of the hierarchical tree. The construction of the hierarchical tree structure and its use in defining the characteristics or attributes of a rendering tool are described below. These and other aspects, advantages and features of the invention will become better understood from the detailed description of a preferred embodiment of the invention which is described in conjunction with the accompanying drawings.

BEST MODE FOR PRACTICING THE INVENTION

The present invention relates to method and apparatus for controlling the rendering of images on a computer screen. The images are formed from a number of possible sources such as from video tapes or digitally stored images. The present invention has particular application to controlling the style of a graphics image rendering tool. The style is a component that includes a number of subcomponents that at least in part define how the image rendering tool applies text and brush strokes to a computer display.

Computer Imaging System

Figure 1:
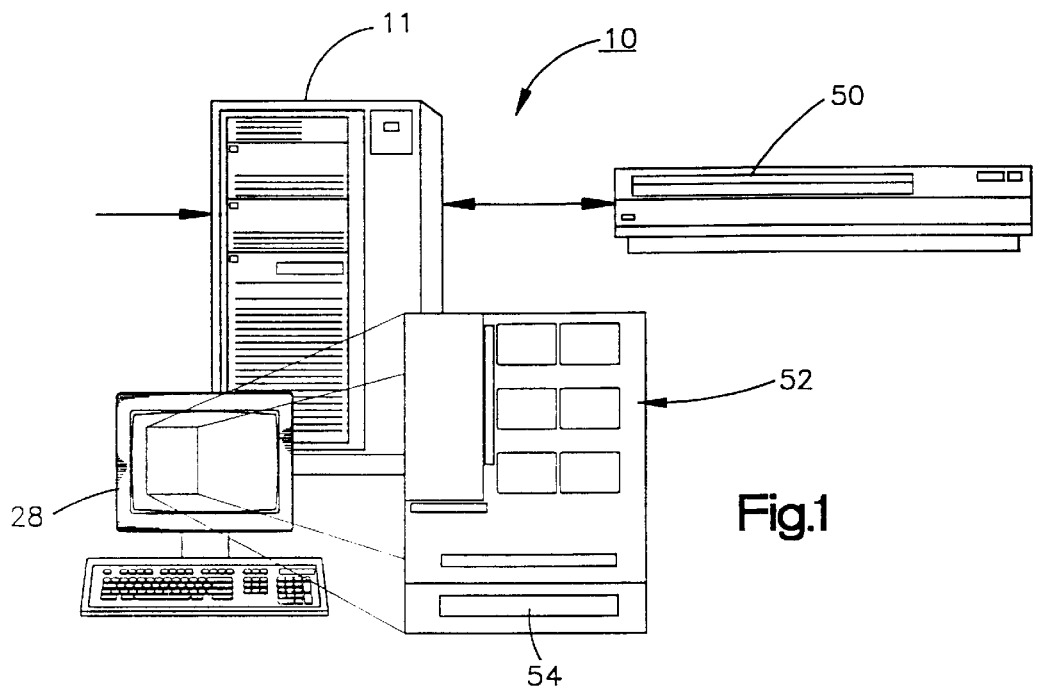
FIG. 1 is an overview of a computer system suitable for rendering display images in accordance with the present invention.
Figure 2:
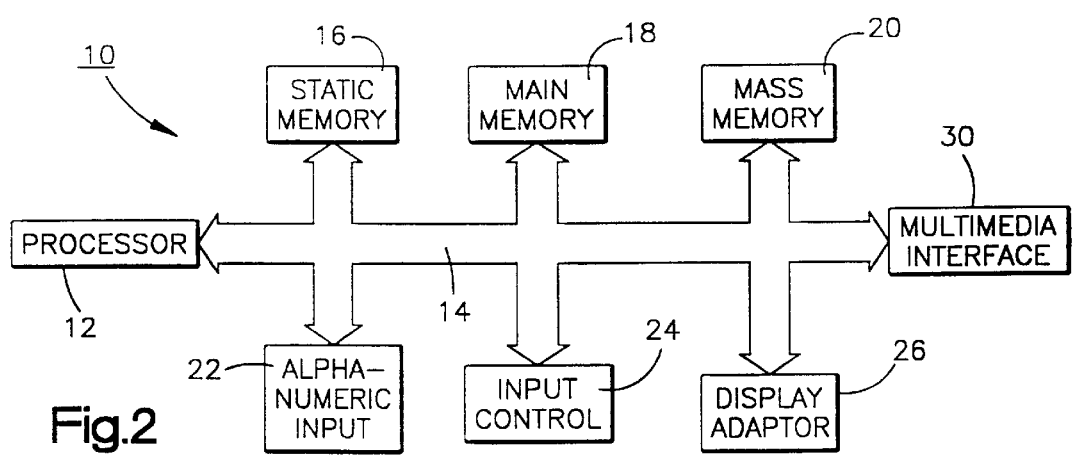
FIG. 2 is a schematic representation of the FIG. 1 computer system.

A computer graphics imaging system 10 is schematically depicted in FIGS. 1 and 2. The graphics imaging system 10 includes a computer 11 that has a processor 12, a system bus 14, a static memory 16, a main memory 18, a mass memory 20, an alphanumeric input device 22, an control device 24 for manipulating a cursor, and a display adapter 26 for coupling video control signals to a video display 28 such as a computer monitor. Since the graphics imaging system 10 is particularly suited to high resolution, high speed graphics imaging the display or monitor 28 is most preferably a high resolution wide screen display.

The processor 12 executes imaging software described below to allow the system 10 to render high quality graphics images on the monitor 28. The processor 12 comprises a suitable processing device such as a microprocessor, for example, and may comprise a plurality of suitable processing devices. The processor 12 executes instructions stored in the static memory 16, main memory 18, and/or mass memory 20.

The static memory 16 may comprise read only memory (ROM) or any other suitable memory device. The static memory 16 may store, for example, a boot program for execution by the processor 12 to initialize the data processing system 10. The main memory 18 may comprise random access memory (RAM) or any other suitable memory device. The mass memory 20 may include a hard disk device, a floppy disk, an optical disk, a flash memory device, a file server device, or any other suitable memory device. For this detailed description, the term memory comprises a single memory device and any combination of suitable memory devices for the storage of data and instructions.

The system bus 14 provides for the transfer of digital information between the hardware devices of the data processing system 10. The processor 12 also receives data over the system bus 14 that is input by a user through the alphanumeric input device 22 and/or the cursor control device 24. The alphanumeric input device 22 may comprise a keyboard, for example, that comprises alphanumeric keys. The alphanumeric input device 22 may comprise other suitable keys, comprising function keys for example. The cursor control device 24 may comprise a mouse, touch tablet, track-ball, and/or joystick, for example, for controlling the movement of a cursor displayed on the computer display 28.

The FIG. 1 data processing system 10 also includes display adapter hardware 26 that may be implemented as a circuit that interfaces with the bus 14 for facilitating rendering of images on the computer display 28. The display adapter hardware 26 may, for example, be implemented with a special graphics processor printed circuit board including dedicated random access memory that helps speed the rendering of high resolution, color images on a viewing screen of the display 28.

The display 28 may comprise a cathode ray tube (CRT) or a liquid crystal display (LCD) particularly suited for displaying graphics on its viewing screen. The invention can be implemented using high speed graphics workstations as well as personal computers having one or more high speed processors.

The graphics imaging system 10 utilizes specialized graphics software particularly suited to take advantage of the imaging hardware included in the display system 10 depicted in FIGS. 1 and 2. The software integrates non-linear editing, compositing, audio mixing, and graphics design suites which are used to create multimedia presentations. Source material for use with such a system can be obtained from a media storage device 50 that can include videotape, film reel, and digital recorded video disks. The source material can also be in the form of already digitized materials stored on a computer memory 20 such as computer-generated animations, graphic images or video files stored on a large capacity hard or fixed disk storage. To utilize the source images from the media storage 50, the system 10 includes a multi-media interface 30 for converting image data into a form suitable for use by the software executing on the processor 12 and display adapter 26. A representative display produced by the graphics software (FIG. 1) presents multiple images 52 of different resolutions. A time line control 54 beneath these multiple images allows the user to select from an video clip of many such images.

Graphics Imaging Suite

Figure 3:
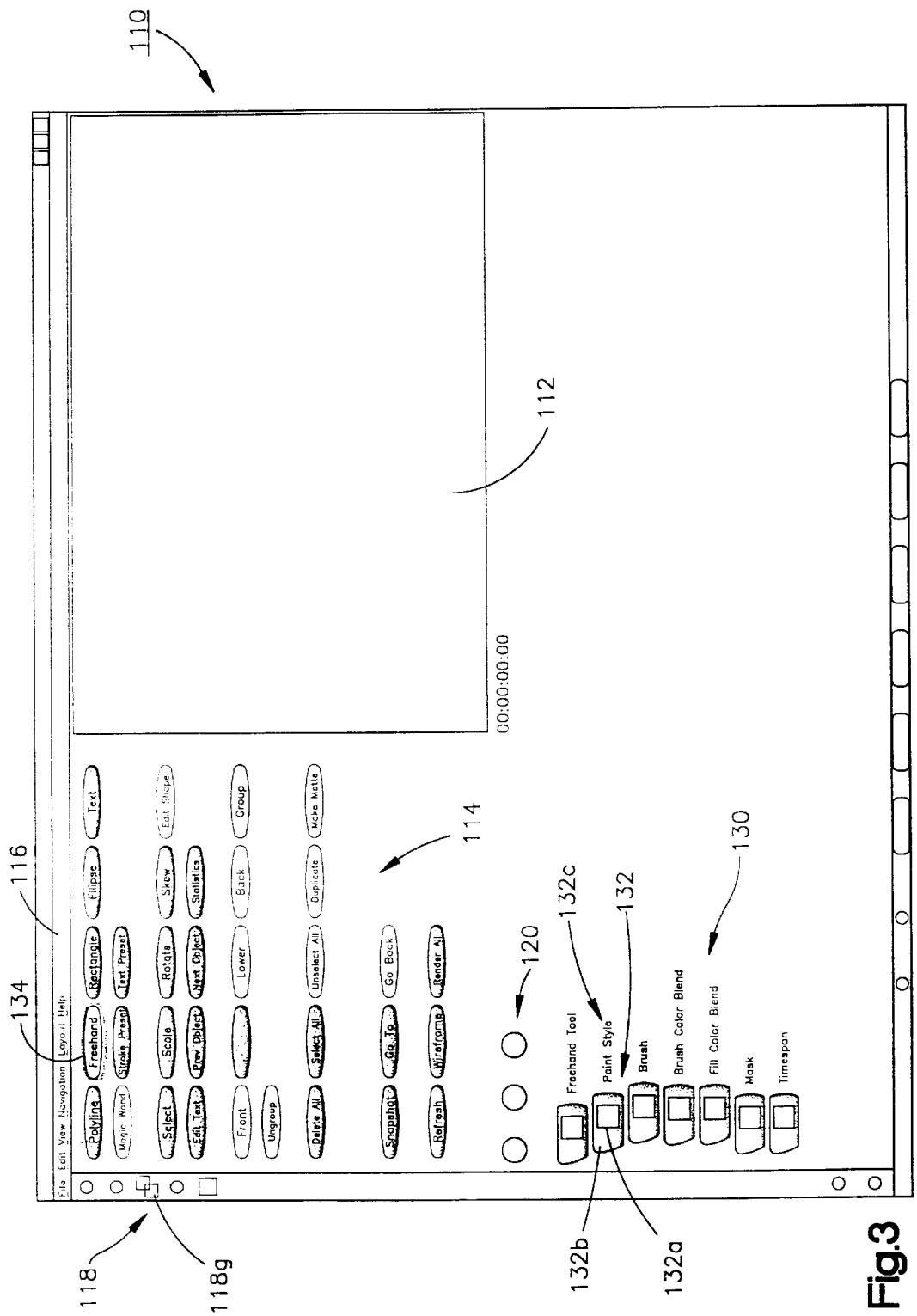
FIG. 3 is a visual representation of a computer display illustrating one display mode for use in presenting images.

FIG. 3 illustrates a typical screen display 110 for use in graphics imaging by a graphics design suite that forms part of the graphics software. The screen display 110 includes an image viewing area 112, a console area 114 that includes a number of sculpted buttons that are actuated by selecting or clicking on the button with the cursor control device 24. The graphics software is executed under a Windows based operating system that includes functions for creating a frame window having a menu bar 116. A taskbar 118 located along the side of the console area 114 allows the user to switch between tasks by activating or selecting different icons in the taskbar 118. The graphic design suite having the user interface depicted in FIG. 3 is launched by choosing or selecting a graphics icon 118g from the multiple icons spaced along the side of the console area in the taskbar. Others of the multiple icons cause the software to display other displays particularly suited for other tasks to perform such as editing, audio mixing, or combining multiple video layers into a combined audiovisual output.

Below the console area 114 the display includes an array 120 of icons that allow different graphics related functions to be performed with the imaging system 10. The user selects a different software function, such as editing, by selecting a different icon found on the taskbar 118. When the user selects a different option the user interface changes to depict a different set of icons for performing another set of tasks.

Graphics Components

In the description that follows, a graphics component is referred to in a generic way to refer to an object that forms part of a rendering tool. The component is depicted on a tree structure 130 (FIG. 3) that is displayed on the computer monitor. The tree structure facilitates user control over the graphics components that make up the rendering tool and more particularly facilitates the steps of defining, saving and modifying the components that make up the rendering tool.

A style object 132 is one object that helps define a freehand graphics rendering tool used in forming brush strokes on the image viewing area 112 of the screen display 110. By choosing or selecting the style component 132 from the tree 130 a style editor is launched displaying a number of attributes or subcomponents of the style component 132. The style editor allows the user to redefine attributes that combine to define the style of the tool that is used in painting on the computer display.

The style component that is defined by use of the style editor can be saved to disk or to the memory 20 as a preset style. The style object can then be retrieved so that some or all of the stored attributes for a designated one of multiple customized paint styles can be used in subsequent graphics rendering on the computer monitor 28.

Paint Example

The tree 130 depicted in FIG. 3 is one of a number of possible tree configurations that the graphics software presents to the user based upon the type of graphics control the user has selected in the console. The particular tree depicted in FIG. 3 is presented in response to the user selecting a 'Freehand Tool' button 134 in the console area of the display. Drawing with the freehand tool imprints a series of stamps of a specific brush shape onto the surface of the viewing area 112 as the user moves the tool across the display with the cursor control 24.

The user navigates the tree 130 by selecting the tree components to access subcomponent objects or branches. As an example, a paint style button 132 has a rectangular icon region 132a that gives the user a visual guide to use of the component. The icon region 132a is bordered on the left by an expand region 132b. Clicking on the button outside the expand region 132b or on the buttons title 132c launches a style editor (FIG. 10) that helps define the attributes or subcomponents of the style component.

Clicking on the button in the expand region 132b to the left of the icon causes subcomponents of the style component to be displayed on the tree 130. A component with no branches (i.e. a leaf on the tree structure) has a '-' designation displayed on its expand region to the left of the icon. This is an indication to the user that there are no further constituent subcomponents for that object.

Figures 5A, 5B:
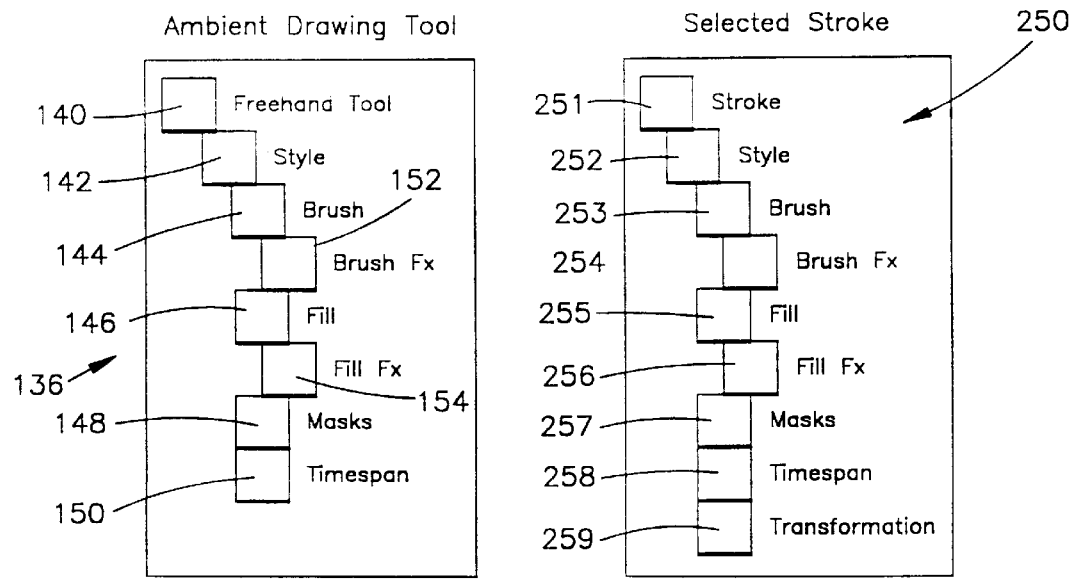
FIGS. 5A and 5B are schematic depictions of alternate hierarchical graphics objects that aid a user in controlling the painting or rendering of images on the computer display.

In order to simply depict alternate tree configurations encountered by the user, tree components in the other drawings used to describe the invention are depicted as boxes that are interconnected to define their hierarchical structure. These simplified tree depictions are to be contrasted to the sculpted, shaped tree components of FIG. 3. FIG. 5A, for example, is a simplified depiction of a tree structure 136 presented to the user beneath the console area 114 in response to selecting the freehand button 134.

A freehand tool component 140 has a single style component 142 that includes four subcomponents 144, 146, 148, 150. A brush component 144 has been expanded to show its brush effect subcomponent 152 and a fill component 146 has been expanded to show its subcomponent 154. When the drawing freehand tool is first selected by actuating the button 134 on the console 114 the various components that make up the tool are defined by so-called ambient settings that are then in affect in the graphics mode.

The freehand and polyline are examples of 'creation' tools, e.g. tools that produce data. The data they produce (text bodies, paint strokes) inherit instance-specific collections of properties from 'ambient' values present in the system at the time of the creation of the tool. Once created, objects such as paint strokes maintain their own distinct set of properties which are not affected as the user changes the ambient settings of the tool in preparation for drawing the next stroke or entering another text body.

Figure 8A:
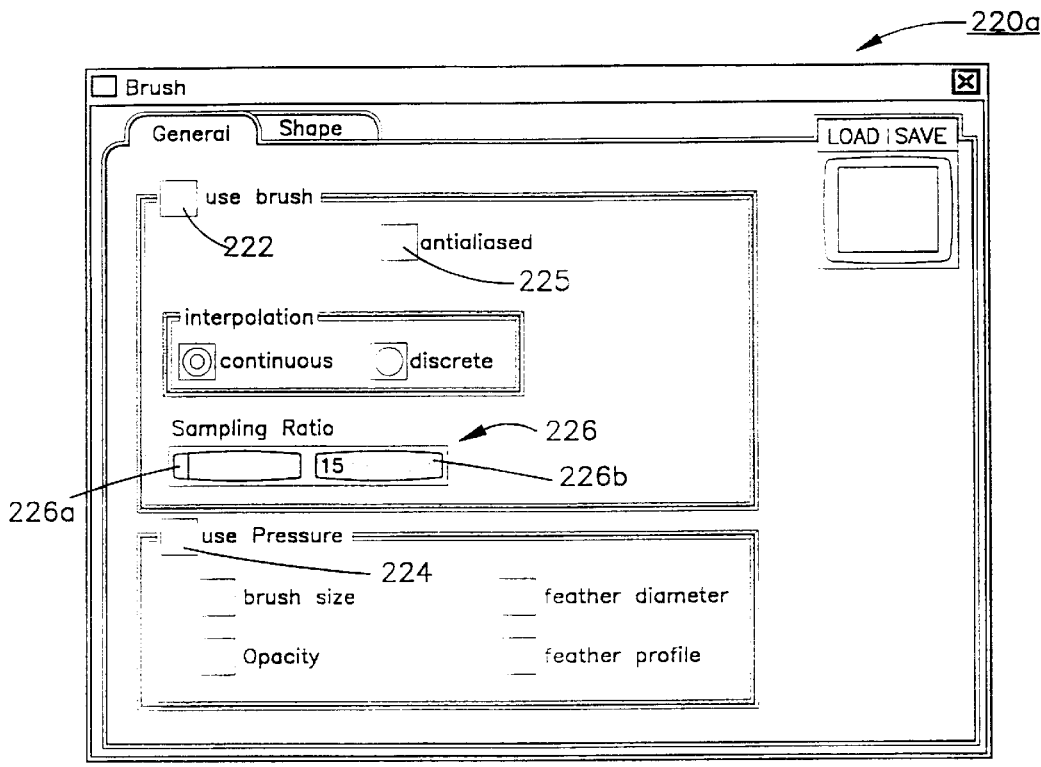
FIGS. 8A and 8B are depictions of brush editors for use in defining attributes of a brush.
Figure 8B:
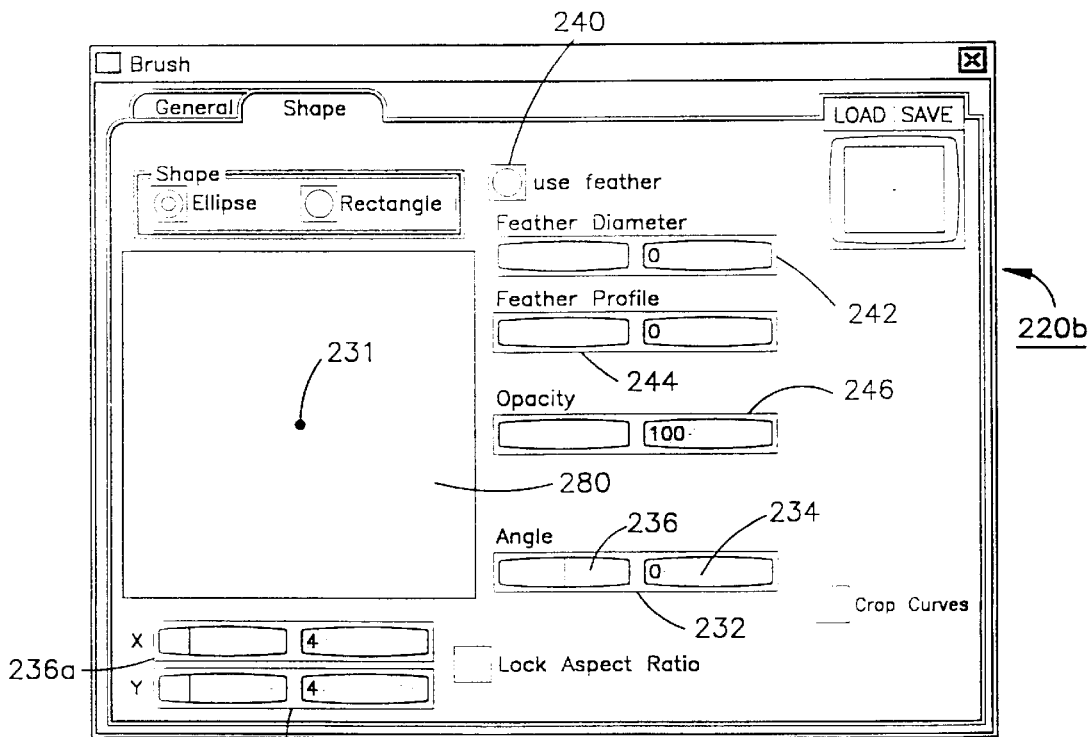
Figure 9:
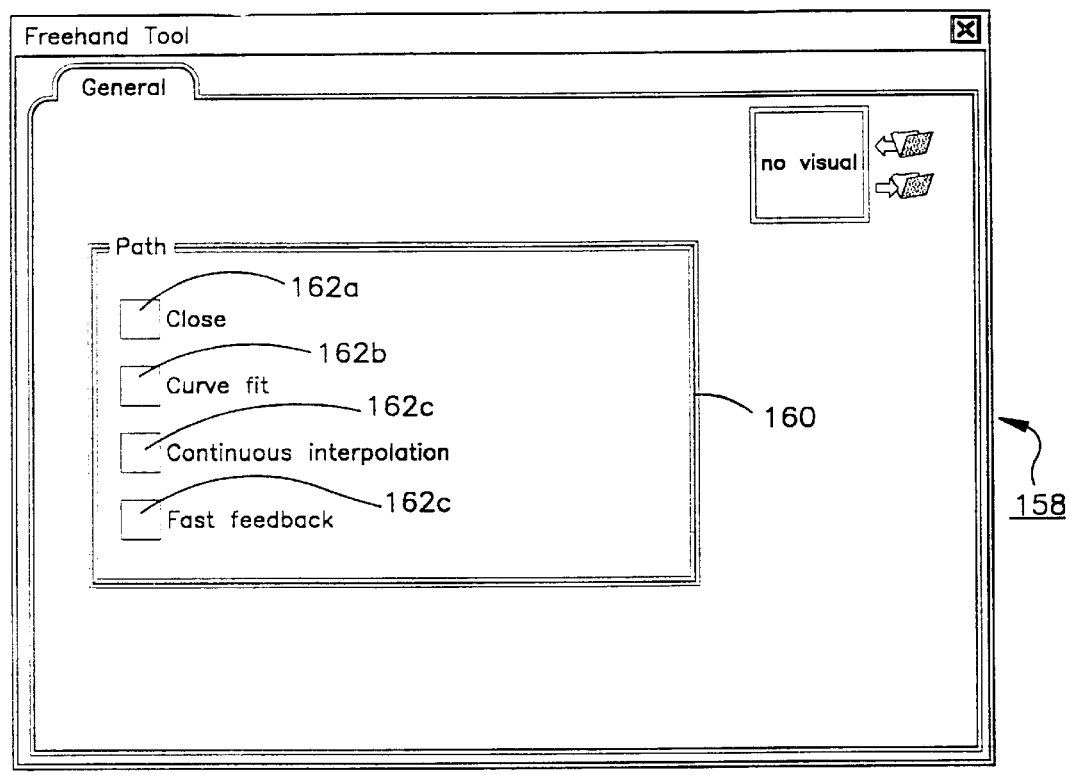
FIG. 9 is a freehand tool editor for use in defining the attributes of a freehand tool for use with the present invention.

Choosing the freehand tool component 140 from the tree 136 shown in FIG. 5A launches a freehand tool editor 158 shown in FIG. 9. The freehand tool editor includes means for defining the manner in which the software responds to freehand strokes applied to an image in the viewing region. The editor includes a path box 160 that allows the user to choose one of four checkboxes 162a–162d to select either a closed stroke, a curve fit, continuous interpolation or fast feedback. The property editors for a representative sampling of other imaging components depicted in FIG. 5A are illustrated in FIGS. 7, 8A, 8B, 9, 10, 11A, 11B, 11C and 12.

The simplified tree structure of FIG. 5A include a style object 142 as a component of the freehand tool object. The style object 142 contains within it a definition of various parameters or attributes required to perform a specific graphics rendering task. As an example, the following two freehand drawing tools have the amount and type components but have different settings for those components such as the brush and brush effect attributes needed to achieve a desired effect.

EXAMPLE 1

Finger Painting

Tool: Freehand (level 1 of the tree 136)

Brush (level 3): Elliptical, with a radius of 50×50 pixels, soft-edged, with hardness diameter of 0, softness diameter of 0, opacity of 100%, sampling ratio of 10, angle of 0 degrees. Brush Effect (level 4): smear, with melting parameter of 96, Wetness of 90.

EXAMPLE 2

Cubistic Smear

Tool: Freehand (level 1 of the tree 136)

Brush (level 3): rectangular, with radius of 30×30 pixels, soft-edged, with hardness diameter of 59.46, softness diameter of 55.41, opacity of 100%, sampling ratio of 10, angle of 45 degree. Brush Effect (level 4): smear, with melting parameter of 98, wetness of 94.

Each of these effects can be controlled by means of the editors associated with the style object and the components that make up the style object such as the brush object 144.

Figure 10:
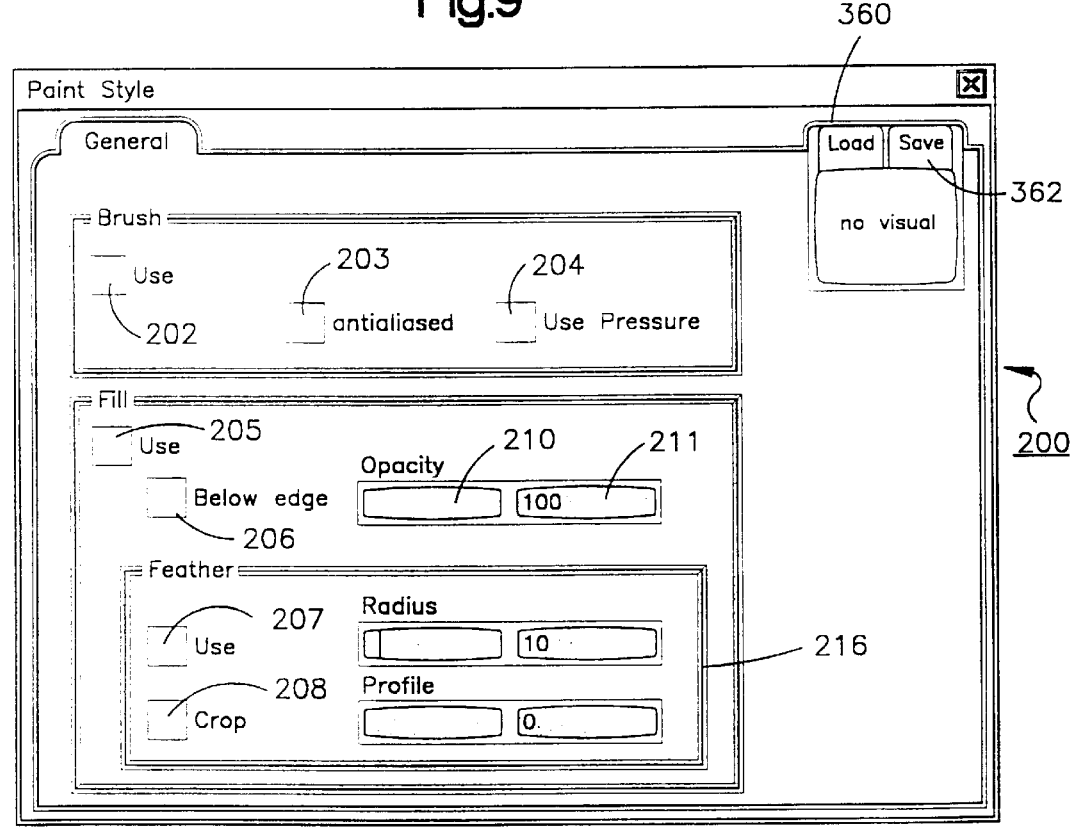
FIG. 10 is a depiction of a paint style editor for use with the present invention.

General style parameters or 'meta' parameters are containers or nodes for more detailed parameters or components of the hierarchical trees shown in FIGS. 5A and 5B. A paint style editor 200 which is depicted in FIG. 10 allows specified brush and fill parameters to be controlled by means of a number of checkboxes 202–208. The more detailed definition of the brush or fill property are left up to an editor for the child property or component. By selecting an appropriate combination of these check boxes the user can control the rendering of a stroke with or without a brush. If the system includes a pressure sensitive tablet the stroke can reflect the pressure applied to the tablet. An antialiased checkbox allows jagged lines to be smoothed when drawing curved or diagonal strokes. The checkbox 205 allows the user to create strokes with fill. Such strokes will have interior regions shaded with fill in accordance with a fill transparency controlled by an opacity slider 210 and an accompanying text box 211. A feather box 216 on the editor 200 allows the edge of the fill to be controlled at the region the fill approaches the stroke.

A brush editor having two tabbed pages 220a, 220b is illustrated in FIGS. 8A and 8B. As seen in the FIG. 5A depiction illustrating the freehand tool tree organization, the brush component is a subcomponent of the paint style component 142. Use of the brush editor allows the user to define the brush and therefor change the characteristics of the paint style of which the brush component is a defining part.

A first tab page 220a of the brush editor allows the user to define general brush characteristics or attributes. Two checkboxes 222, 224 dictate whether ambient brush characteristics are used or whether the pressure applied to the cursor control device 24 will determine the brush characteristics. These same two characteristics or attributes are controlled through the style editor of FIG. 10. Since the brush is a component of the paint style, the editors were designed to link the characteristics so that changes made using one editor will automatically be reflected when a second editor for a subcomponent is accessed for adjusting these characteristics. An antialiased checkbox 225 causes the software to smooth out jagged lines when drawing with curved or diagonal strokes. A sampling ratio control 226 is used to set the distance between each brush stamp in a stroke of the brush. A lower value creates a short distance between each brush stamp, causing the stroke to be denser and a higher value creates a wider distance between brush stamps causing each stamp to appear more distinctly. The sampling ratio control 226 includes both a slider 226a and a text box 226b for adjusting the sampling ratio.

The brush component includes a brush size and shape which are controlled by a second tabbed page 220b of the brush editor. In the above two examples of the Cubic Smear and the Finger Painting the shapes were rectangular and elliptical. As seen in FIG. 8B the tabbed page 220b includes a viewer 230 that illustrates a stroke 231 for the freehand tool that allows the user to monitor effects on the stroke as he or she adjusts the brush attributes. The user can make a shape selection to start a new brush or as described below can begin with a selected stroke and modify the brush used to create the stroke. An angle control 232 adjusts the axis of the brush shape. This angle can be adjusted by either entering a value in a text box 233 or by adjusting a slider 234. Width and height controls 236a, 236b adjust the size of the brush and a lock aspect ratio checkbox 238 links the two controls so that an adjustment to either the width or the height automatically adjusts the other. A 'use feather' checkbox 240 toggles between a soft edge and a hard edge for the brush. A hard edge has a sharply defined border and a soft brush edge has an adjustable gradient that gives the edge a soft or fuzzy appearance. If the soft edge is chosen with the checkbox 240, a diameter control 242 controls the hard portion of the brush as a percentage and a profile controls the gradient or rate of fall off from the hard portion of the brush. An opacity control 246 determines the level of brush transparency. A value of 0 creates a brush stroke that is totally transparent and a value of 100 cause the edge to be drawn exactly as the color property editor depicts the color.

Turning to FIG. 5A, one sees that the brush component 144 has a brush effect subcomponent 152. An editor for this subcomponent (not shown) allows the color of the brush to be determined from a palette of available colors. Additionally the choices available from the palette can be adjusted by means of slider controls that dictate the red, green, and blue components of the palette selections.

Stroke Editor

It is also possible to change the properties of a selected stroke that is already contained within the viewing area 112. To access and change the properties of an already created stroke the user selects a 'select' button 150 on the console (FIG. 3) and then selects a stroke within the viewer area 112 of the display. A bounding box of the stroke is displayed on the viewing area 112 and the tree 250 of properties for the selected object depicted in FIG. 5B replaces the freehand tool tree 130 depicted in FIG. 3.

Note that the tree of FIG. 5B is quite similar to the tree 136 depicted in FIG. 5A. The tree 250 has components 252–259 arranged in a hierarchical fashion. The topmost component 252 is a stroke component and selecting this component causes a stroke editor 260 of FIG. 7 to be displayed. Adjusting properties using the stroke editor 260 affects only the selected stroke. As the properties are adjusted, the stroke's appearance in the viewer 112 changes. The user can also select and modify multiple strokes by holding down a shift key on the alphanumeric input 22 and selecting multiple strokes on the viewer 112.

Turning to FIG. 5B one sees that one difference between the tree 250 and the tree 136 of FIG. 5A is the addition of a new style subcomponent, i.e. the transformation subcomponent 259. This new node is added at the time a stroke is created. Now if the user saves a preset at the top level of the tree, this preset will include the transformation property of the selected object. In particular, the user can later load the preset and pull in from memory the entire stroke as it was earlier drawn in a single action.

Figure 7:
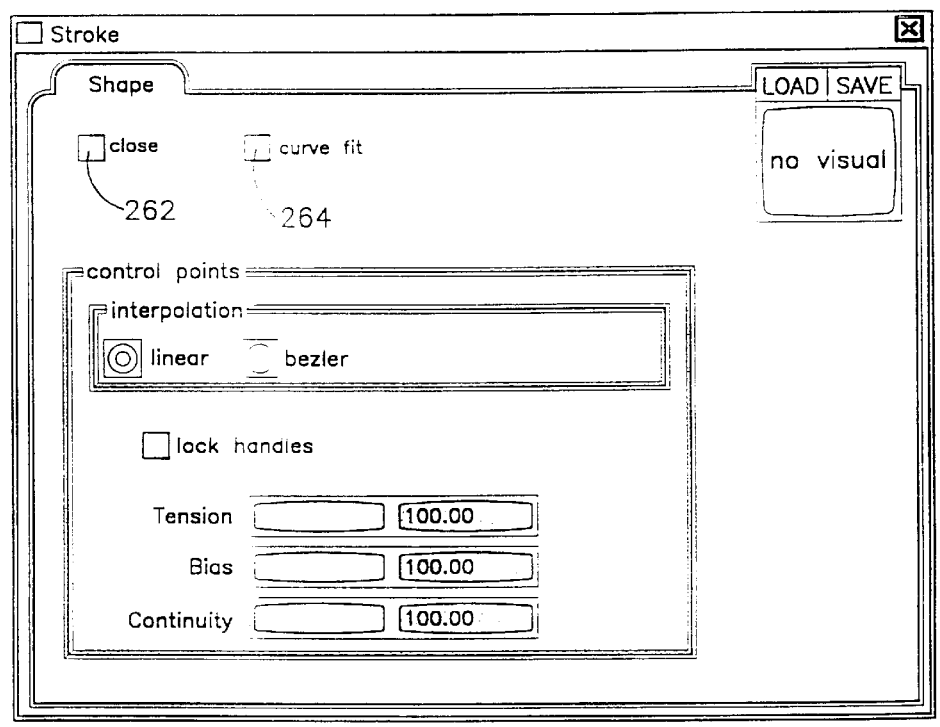
FIG. 7 is a depiction of a paint stroke editor for use in defining attributes of a selected stroke.

The stroke editor 260 of FIG. 7 allows the user to define the stroke rendering characteristics. Two check boxes 262, 264 define the response to the user moving a brush across the screen. A close box 262 causes strokes to be closed paths and a 264 causes strokes to be approximated by a closest fit curve. A linear interpolation box 266 causes brush strokes to be interpolated with a linear approximation and a bezier box 268 causes the brush strokes to be approximated by a bezier curve. When using the bezier curve the lock handles checkbox 270 causes the curve to have two control handles that are locked together and if this box is not checked the control handles may be individually controlled.

Masks

The trees 136, 250 of FIGS. 5A and 5B each includes a mask component 148, 257. A mask is an image, portion, or component of an image that defines which pixels, paint strokes, and titling characters affect the image. The mask property editors allow the user to select which RGBA channel to mask, add a paper grain, or mask the image with an alpha channel to create a matte. Mattes are defined by the alpha component of an image and in the paint mode are used by the graphics software to define a stencil. The matte protects portions of the image surface.

Figure 11A:
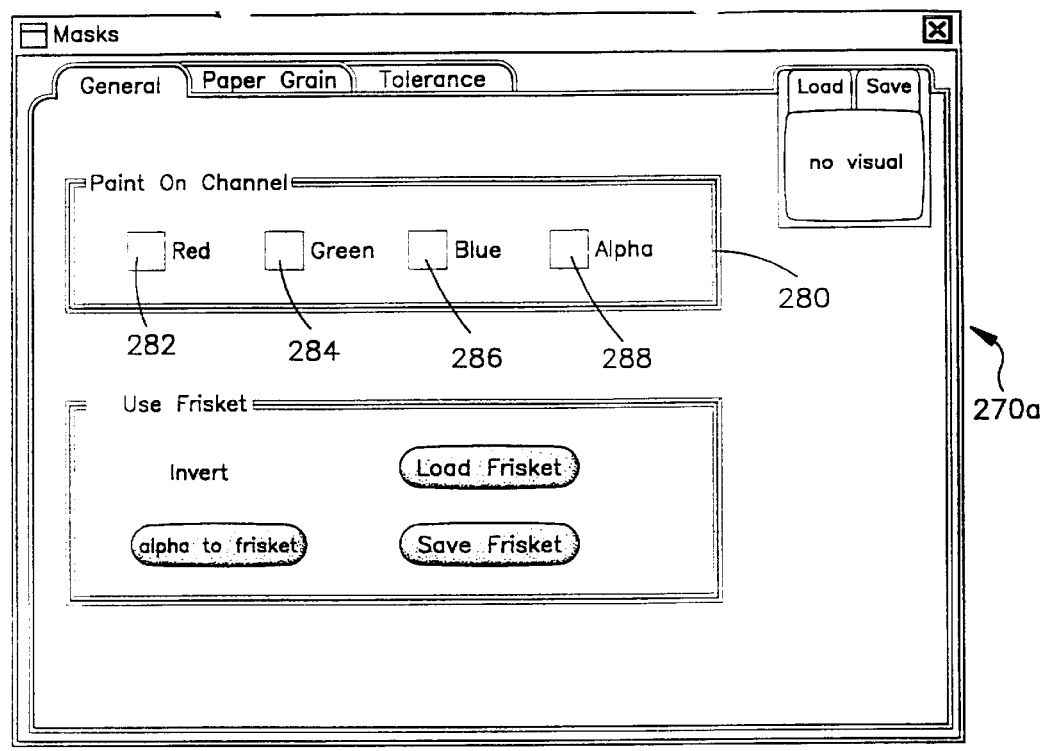
FIGS. 11A–11C are depictions of editors for use in defining masks for use with the present invention.
Figure 11B:
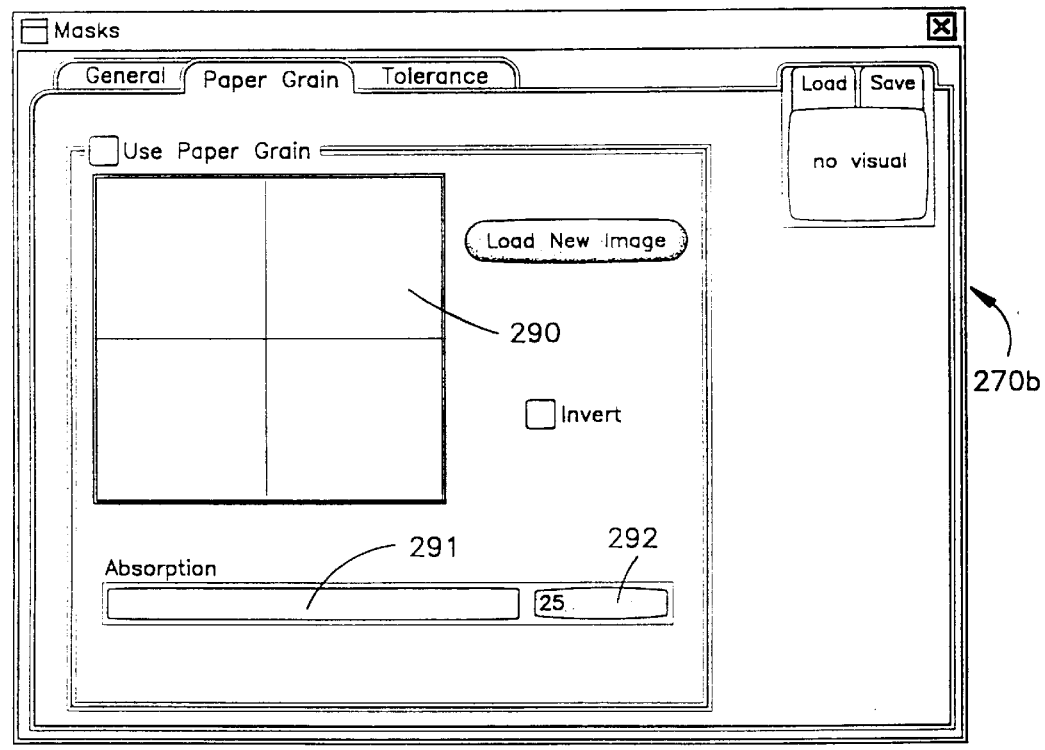
Figure 11C:
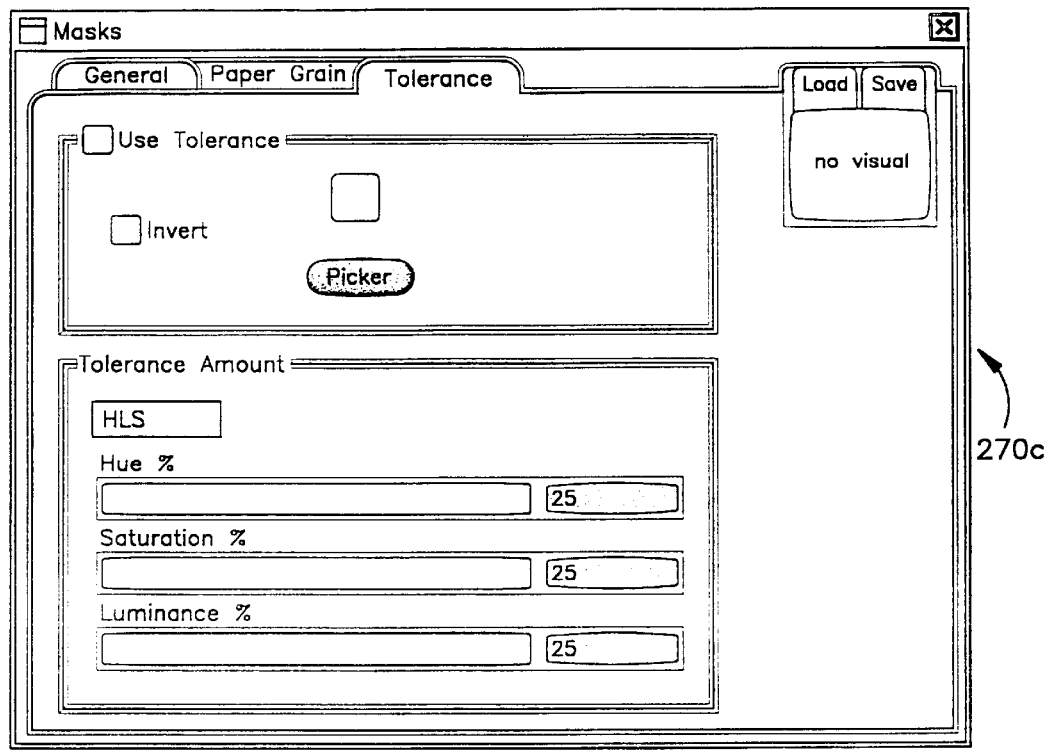

The mask editor is launched by selecting the mask component on the tree of FIGS. 5A and 5B and includes three tabbed displays 270a, 270b, 270c that are depicted in FIGS. 11A–11C. A paint on channel box 280 has four checkboxes 282, 284, 286, 288 allow different channels to be painted. As an example, if the red channel is selected, only the strokes red component is painted. By painting with the alpha channel one paints with a matte.

A paper grain tab (FIG. 11B) allows a texture to be applied to subsequent brush strokes. This will allow one to create an effect of painting on a textured canvas. A paper grain image is displayed in a viewing box 290 and can be adjusted by loading in other images from disk. A text box 291 and slider 292 control an absorption factor. This will control how paint that is applied by brush strokes is absorbed by the textured surface of the paper grain.

A final tabbed page (FIG. 11C) allows the user to mask drawable portions of the image based on a specific color and tolerance range. The user selects a color either from the screen using a color picker widget or by defining a color through a color palette and editor. This color becomes the seed color for the mask, and tolerances can be set for red, green, and blue or hue, saturation, and luminance respective to that color. Setting this tolerance masking property ON will create a greyscal mask in memory. The user can choose whether this mask allows drawing within the target color range, or its inverse. For example, one could choose the red within a flower in an image, and set the appropriate tolerance, thus constraining all subsequent drawn effects within all similar red flowers in the image.

Once all properties of the drawing tool components have been defined by means of user selection and control in the property editors, the drawing tool has been defined and the user can select the viewing area 112 and begin to add strokes that have the chosen style to the image in the viewing area. A representative sampling of the editors used in defining the tree components in FIGS. 5A and 5B have been described. It is appreciated, however, that the components such as fill and fill effect have their own editors for adjusting their component attributes.

The wetness and melting parameters control the smear effect in a smear editor. These two parameters can affect brush strokes that follow paths and control the combining with the existing brush stroke with the previously rendered portion of the image over which the brush is moved. Melting controls the area in which the image is combined and wetness controls the degree or intensity of the combination.

Text Titling Properties

In addition to stroke based brush defined rendering, the graphics software supports text generation much like a word processor. The user creates and edits text in a titling body. The titling body is a group of words, lines and paragraphs which the user can manipulate like a single graphic object. When a titling body is created it inherits ambient text properties that define its appearance. Titling components include character edge, fill and shadow effects as well as masks. The appearance or format of the text can also be controlled using text formatting options such as margin width, font size, leading etc. When the user is creating and editing text the text is displayed in the viewing area 112 of the display 28.

Figures 6A, 6B, 6C, 6D:
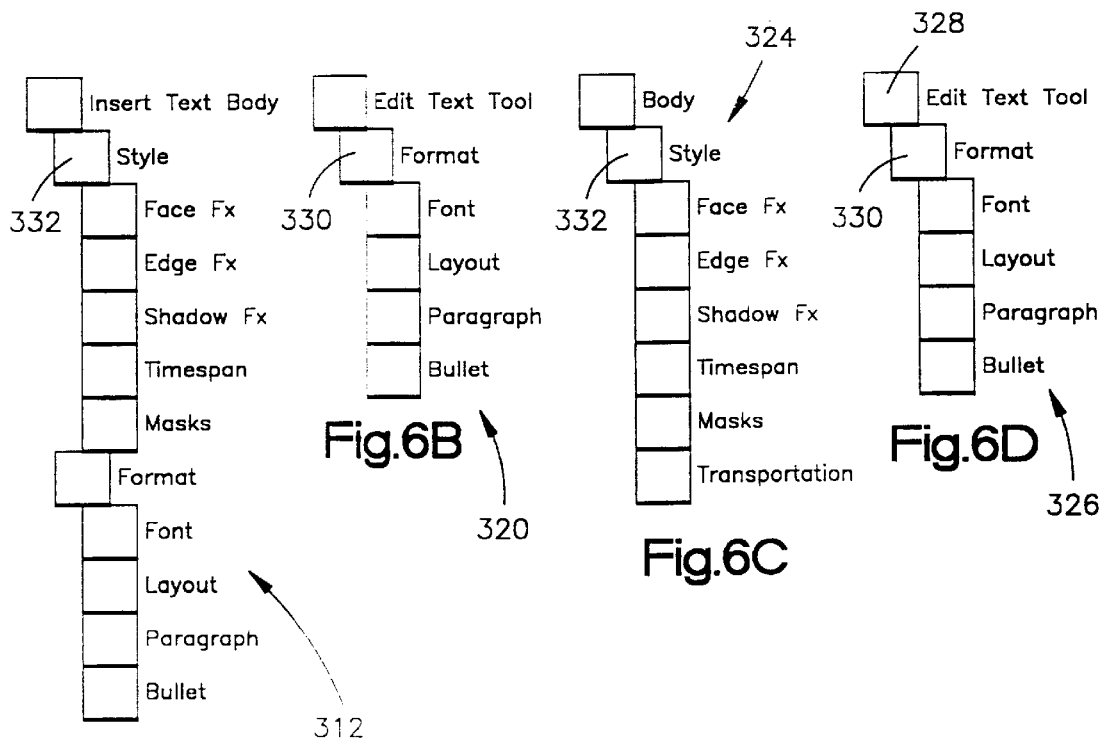
FIGS. 6A–6D are schematic depictions of a sequence of hierarchical graphics objects for controlling the depiction of text on a computer display.

To create a titling body, the user selects a 'text' button 310 on the console 114 and the software displays a text tree 312 as illustrated in FIG. 6A. The user then moves the cursor over the viewing area 112 and uses the pointing device 24 to create a new text body at the selected location within the viewing area 112. When the user clicks in the viewing area to create a new body, a 'edit text' button 316 in the console 114 is depressed and the 'text' button 310 is deselected. The tree 312 changes to the tree 320 of FIG. 6B to reflect the format of the body that is now selected. If text is then typed without adjusting this format, the text that is typed has the ambient attributes of the text titling body. If the user adjusts the format before typing subsequent keystrokes the text will have the newly defined text attributes.

As was the case with painting brushstrokes discussed above, the user can select and view attributes of already existing text contained within a titling body. The user clicks on the 'select' button 310 and then moves the cursor over a text body within the viewer area 112. By clicking on the text body, the tree 324 of FIG. 6C is displayed and the style attribute of the selected body is shown. When this happens, the format of the body is not shown in the tree depiction. To display the format of selected text, the user chooses the 'edit text' button 316 and the tree 326 of FIG. 6D is shown having a top 'edit text tool' component 328 and a format component 330.

Figure 13:
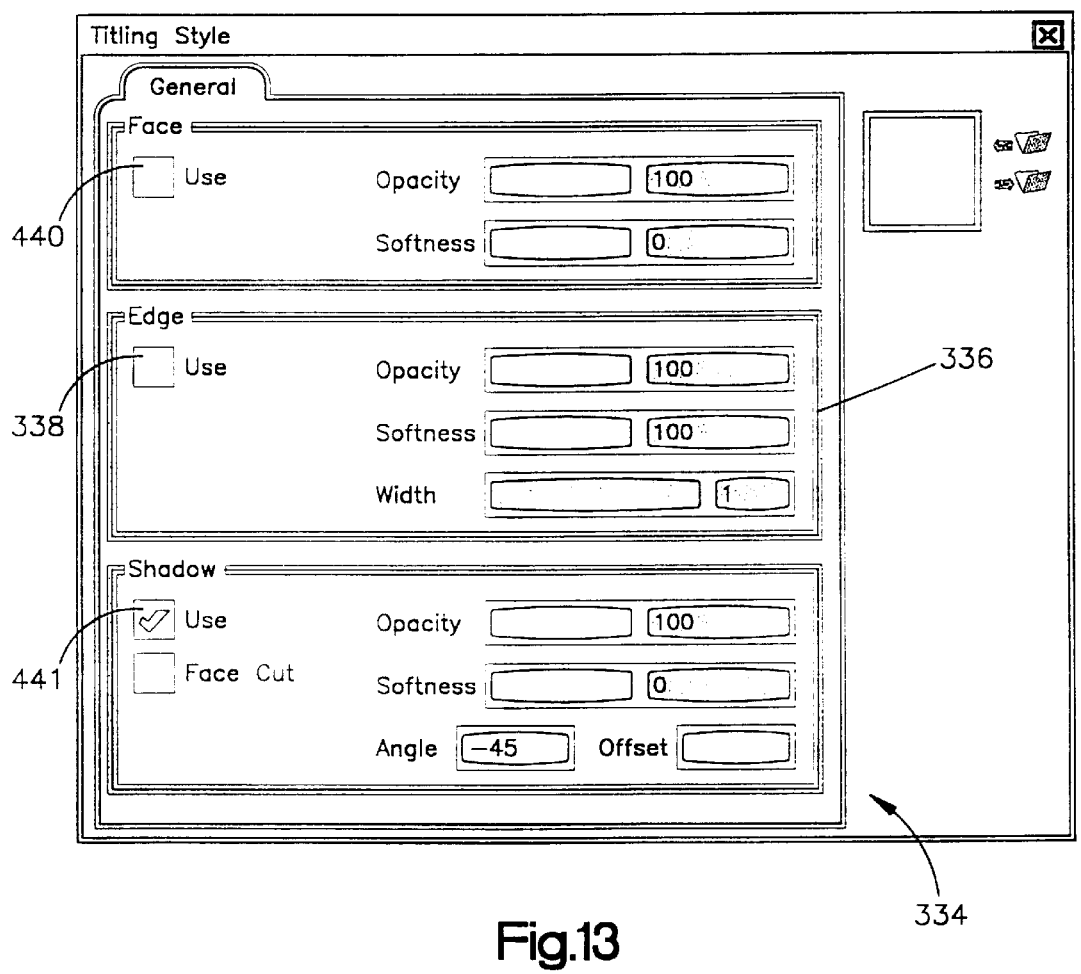
FIG. 13 is a titling style editor for adjusting a manner in which text is displayed within a viewing area of the computer display.

Each of the subcomponents beneath the text style component and the format component has a property editor associated with it for adjusting or displaying the attributes of that subcomponent. As one example, when the clicks on a 'style' component 332 depicted in either FIGS. 6A or 6C a titling style editor 334 (FIG. 13) is launched. This editor includes an edge attributes panel 336 having a checkbox 338 for using character edges defined by a separate edge editor. If the checkbox 338 is checked and no changes are made to these character edges, ambient values are used. Similarly, the face and shadow attributes of displayed text are controlled by checkboxes 440, 441 and controls associated with those checkboxes.

Presets

Figure 4:
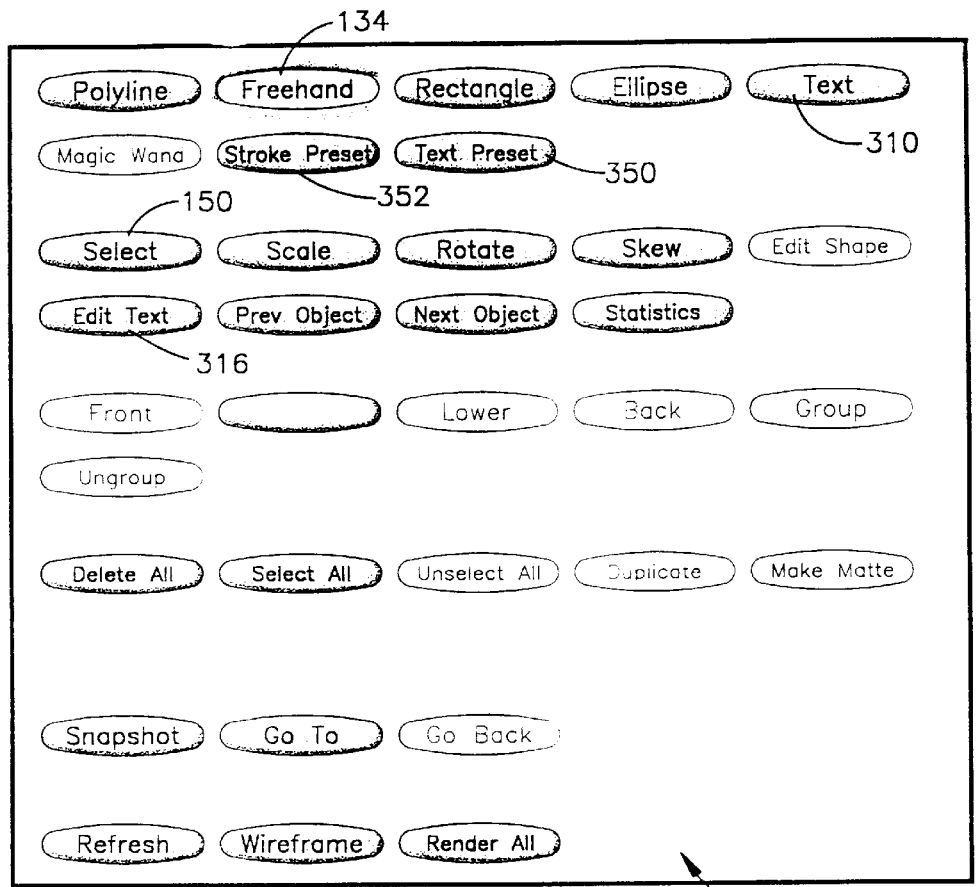
FIG. 4 is an enlarged graphic depiction of a portion of the Figure computer display showing a number of pushbuttons for activating graphic rendering functions on the computer display.

Turning to FIG. 4 one sees that there are two buttons labeled 'text preset' 350 and 'stroke preset' 352 in the console region 114 of the graphics display. The attributes for a plurality of custom or preset styles can be stored within a memory store such as a computer fixed disk drive. Under the control of the user, some or all of the stored attributes for a designated preset are retrieved from memory so that some or all of the attributes of a particular style preset can be associated with a graphics rendering object or tool. Subsequent use of the tool is controlled, at least in part, by the attributes of the style preset.

A preset is a customized set of properties for a particular effect, such as a paintbrush, font, or color palette. The software also comes with a set of presets. When the software is installed, a full array of predefined presets are loaded and these pre-sets can be supplemented by the user.

Figure 12:
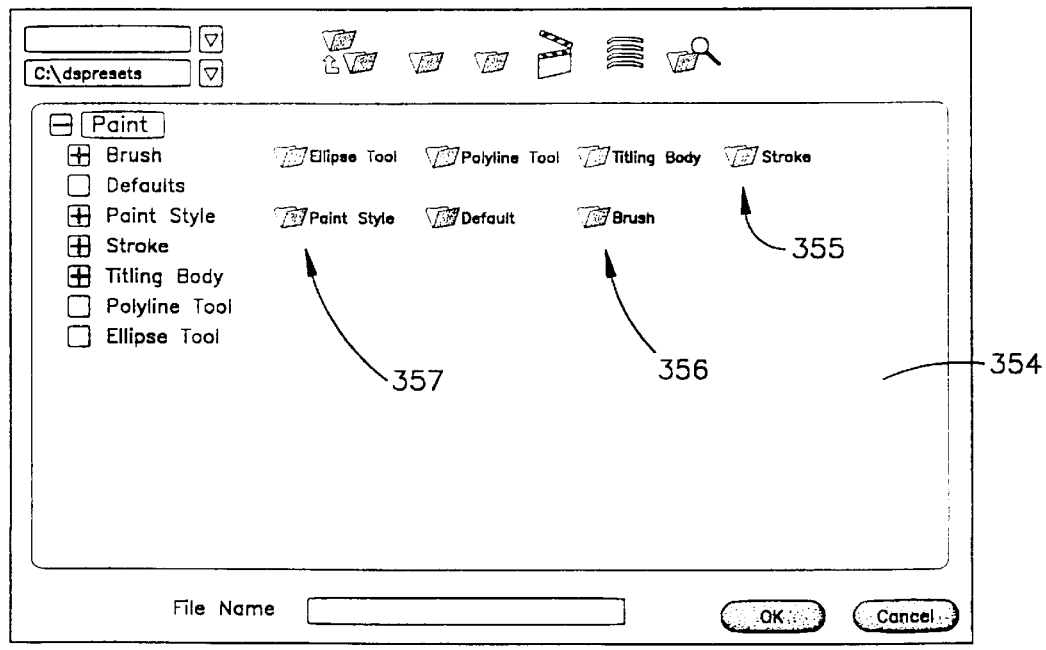
FIG. 12 is a depiction of a preset browser for use in obtaining paint object attributes from a storage device such as a disk drive of the FIG. 1 computer system.

FIG. 12 is a depiction of a preset browser 354 for accessing these stored presets. Use of a stroke preset adds a stroke on top of the image currently displayed in the viewing area 112. To use a stroke preset the user selects the 'stroke preset' button 352 which causes the browser 354 to be launched with a stroke subfolder 355 opened. The user selects one of the stroke presets and the stroke is displayed in the viewing area 112. To remove a preset from the image in the viewing area 112, the user chooses the 'Select' button 150 and clicks on a stroke within the viewing area 112. The user then presses the delete key on the alphanumeric control 22 to remove the stroke from the viewing area 112.

Use of stored presets allows the user to edit a property or graphics component within an editor and then save that property as a preset. When the user selects a preset from the browser 354, its settings are loaded from disk into the appropriate property editor for use or for modification with those editors.

As an example, the browser 354 can retrieve a preset brush from a brush folder 356 into the brush property editor. As seen in FIG. 12 the user can choose from a number of preset subfolders and these presets can contain other presets. Alternately, if one saves a paint style preset in a paint style subfolder 357, one saves attributes of the paint style, the brush that defines part of the style, the brush color blend that defines part of the brush, the fill, the fill color blend etc. These are all accessible from a single style preset.

Loading a preset from lower in the hierarchical tree structure changes only the properties of that component and those it includes but does not affect the properties of components at the same level of the tree structure. As an example, loading a brush into the tree structure 136 of FIG. 5A does not affect the settings or properties that make up the mask 148 of the freehand tool 140. Both the mask 148 and brush 144 define nodes on the tree structure 136. The style object is composed of a set of contained nodes, each containing either other nodes or a collection of parameters. The brush node 144 contains parameters configuring the appearance and behavior of the brush such as opacity, softness, etc. and saving a preset for the brush save the settings for the parameters it contains. Saving a preset for the style creates an object on disk which includes the settings for all the contained nodes, i.e. completely encapsulating the nodes such as brush and by extension all of the parameters that they in turn represent.

To use a property preset to paint strokes the user either selects a stroke to be modified from the viewing area 112 or selects a drawing tool if a new stroke is being drawn. A graphics tree depicted in either FIG. 5A or 5B is displayed beneath the console area 114. The user then selects the property from the tree for which the user wishes to load a preset. Assume a paint style component (found on both trees 136, 250) is selected by the user. The paint style editor 200 of FIG. 10 is launched. This editor 200 includes a load button 360 in the upper right hand corner of the editor. When the user presses this button 360 the browser 354 is launched with the paint style folder 357 opened. The user then selects one of the paint style presets from a list of available paint styles and the preset property settings are applied to the selected stroke or if the preset is being used to create a new stroke the preset properties define new ambient properties.

Returning to FIG. 10, one sees that the paint style editor 200 also includes a 'save' button 362. As the user experiments with different paint styles, by an iterative process of trial and error, a particular stroke achieves exactly the desired affect in the image viewing area. To save that stroke, its style, or another component the user selects that stroke in the viewing area and the property tree of FIG. 5B is displayed. If the user wants to save the entire stroke, the user selects the stroke component from the tree and the stroke editor 260 of FIG. 7 is displayed. If, however, the user wants to save only the style of the stroke, the user selects the paint style component 253 of the stroke tree 250 and then the paint style editor 200 of FIG. 10 is displayed. Saving the style saves the components that make up the style such as the brush (and its subcomponent the brush effect), the fill (and its subcomponent the fill effect), the masks, the timespan, and the transformation.

To save a preset from the editor, the user selects the save button 362 of the editor and a save preset browser (not shown) is launched. This browser allows the user to save the property under its own name ('mypaintstyle', for example) within a subfolder for later retrieval. The preset can be saved in an existing folder or a new folder can be created within the hard disk organization for the presets. Presets of different properties can be saved in the same folder so that, for example, all presets for a particular project could be saved together or alternately all the presets of a particular type can be saved in a pre-defined subfolder for presets of that type. The load preset browser allows the user to view a listing of all types of presets within a given folder.

Text presets allow the user to replicate titling styles and formats. To use a text preset, the user selects the 'text preset' button 350 in the graphics console, and a load titling body preset browser launches to allow a text preset to be loaded. As with the stroke preset, the text body is added to the current paint session (e.g. on laid on top of the current image). Text styles for user generated text can be saved by selecting the text and then choose a text component from the text tree (FIGS. 6A–D) for saving. Any stroke of text component can also be selecting from the viewing area and then one or more of its properties modified in its associated editor before it is saved to disk. If the user chooses not to save the modified component as a preset, the modifications can merely be applied to the selected stroke or text and saved with the image. The ability to select a stroke or text body and view, modify or save as a preset the attributes or characteristics of the selected component is a particularly useful feature of the present invention.

Software Implementation

Each of the components or properties depicted in the various property trees is implemented as an object in the C++ programming language and has well defined attributes or components as well as methods associated with it. A paint style object, for example has a brush component which itself is an object in the C++ sense of the term object. As seen in the hierarchical trees of FIGS. 5A and 5B the paint style object also includes an object of type 'mask' which has its own components and methods.

The paint style object implements many interfaces expected by the desktop to support presets, the tree structure etc. Interfaces are well known and familiar to programmers implementing COM objects in a windows programming environment. One service is IpersistStream which allows an object of type paint style to be saved as a preset and retrieved. An IdsPropertyTree interface allows an object of type paint style to be displayed on the monitor as a tree with its components depicted. An interface called IspecifyPropertyPages allows the components to be displayed within an editor wherein the properties or components of the paint style can be modified. An interface called IMFTimeSpan allows the paint style object to have a start time and a duration. The facility is useful for animation. A separate interface called IdsAnim allows the paint style to be animated. Access to an IDSChild interface allows an object of type paint style to specify its parent. As an example, the paint style of FIG. 5B is the child of a paint stroke object 252. The IDSParent interface allows the object of type Paint Style to replace or modify its child object such as for example its brush components. By replacing the brush (child) with a stored preset (stored using the persistence service of the brush type) the object of type paint style can be changed and applied to a given brush stroke or saved as a style preset.

Listed below is an interface for an object of type brush that inherits these basic services from an "Iunknown" interface. The design of interface declarations for other components or objects such as the paint style object are apparent to one skilled in the art when considered in conjunction with the present description.

```
/////////////////////////////////////////////////////////////////////////
//      Brush Interface                                              //
/////////////////////////////////////////////////////////////////////////
DECLARE_INTERFACE_(IDsBrush, Iunknown)
{
    Clone              (REFIID, LPUNKNOWN*);
    SetBrushImage      (IDSImage*);
    ResetBrushImage    ();
    GetBrushImage      (IDSImage*);
    GetBrushImageRes   (long&, long&);
    SetBrushInput      (IDSImage*);
    GetBrushInput      (IDSImage*);
    SetBrushShape      (GkShape2f*);
    GetBrushShape      (GkShape2f*&); // (comment please)
    SetFeatherDiameter (double);
```

-continued

```
    GetFeatherDiameter   (double&);
    SetCurvature         (double);
    GetCurvature         (Double&);
    SetSoftness          (BOOL);
    GetSoftness          (BOOL&);
    SetBrushAlpha        (double);
    GetBrushAlpha        (double&);
    SetBrushWidth        (double);
    GetBrushWidth        (double&);
    SetBrushHeight       (double);
    GetBrushHeight       (double&);
    SetBrushShapeAngle   (double);
    GetBrushShapeAngle   (double&);
    Build                ();
    StampFlush           ();
    StampBuild           (IDSImage* &, double, double, double);
    StampRect            (Crect&, double, double, double);
};
```

The present invention has been described with a degree of particularity. A presently preferred embodiment of the invention is most preferably implemented with software running under the windows NT operating system, other operating systems having appropriate user interfaces could be used. It is the intent that the invention include all modifications and alterations from the disclosed presently preferred design falling within the spirit or scope of the appended claims.

We claim:

1. A method for rendering images on a computer display comprising the steps of:
   a) defining one or more image rendering tools as a plurality of tool components that define a manner in which a rendering tool paints an image on the computer display wherein at least some of the tool components are made up of multiple tool subcomponents that define an associated tool component and thereby define a multiple level hierarchy of tools, components and subcomponents that characterize the one or more image rendering tools;
   b) storing characterizing data for a plurality of image rendering tools, tool components and tool subcomponents on a memory store for selective retrieval of various combinations of the stored rendering tools, stored tool components and stored tool subcomponents; and
   c) periodically retrieving from the memory store a selected combination of stored rendering tools, tool components and tool subcomponents to define an active rendering tool for subsequent image rendering on the display screen.

2. The method of claim 1 wherein stored rendering tools in the memory store include stored tool components and stored tool subcomponents for retrieval from the memory store to completely define a custom rendering tool.

3. The method of claim 1 wherein the rendering tool comprises a drawing tool that applies a brush stroke that forms a part of the image on the computer display.

4. The method of claim 1 wherein the rendering tool comprises a text rendering tool that applies text that forms a part of the image on the computer display.

5. The method of claim 1 additionally comprising the step of displaying a hierarchical arrangement of components and subcomponents for at least one of the one or more rendering tools on the computer display.

6. The method of claim 5 additionally comprising the step of selecting a tool component, tool subcomponent or entire rendering tool from the displayed hierarchical arrangement and editing characteristics of a selected one of said component, subcomponent or rendering tool.

7. The method of claim 6 additionally comprising the step of saving a tool, a tool component, or tool subcomponent to the memory store for subsequent retrieval as a preset tool, component or subcomponent.

8. The method of claim 1 comprising the additional steps of selecting an object within an image display region of the computer display and displaying at least some of the tool rendering components or subcomponents that made up the rendering tool that originally was used to paint the object onto the image display region.

9. The method of claim 8 additionally comprising the step of adjusting one or more of the components or subcomponents that are associated with the selected object and causing the computer display to adjust an appearance of said object on the computer display to reflect said adjusted components or subcomponents.

10. A method for use in rendering images on a computer display comprising the steps of:
    a) defining brush strokes as a plurality of brush stroke components that at least in part define a manner in which a brush stroke appears on the computer display and additionally wherein at least some of the brush strokes components are in turn made up of multiple brush stroke subcomponents that define an associated brush stroke component and thereby defining a hierarchy of brush stroke components that characterize a brush stroke; and
    b) selecting a region on the computer display to highlight a brush stroke and displaying the hierarchy of brush stroke components and brush stroke subcomponents associated with the highlighted brush stroke on a separate region of the computer display.

11. The method of claim 10 additionally comprising the step of depicting the brush stroke chosen on the computer display as a hierarchical structure wherein brush stroke components are depicted as branches or leafs on a tree structure wherein the branch components in turn include one or more brush stroke subcomponents.

12. The method of claim 11 additionally comprising the step of selecting a component or subcomponent of the hierarchical structure and saving data associated with the selected component or subcomponent in a memory store for subsequent retrieval as a preset component or subcomponent.

13. A method for use in rendering text on a computer display comprising the steps of:
    a) defining text as a plurality of text components that at least in part define a manner in which a text appears on the computer display wherein at least some of the text components are in turn made up of multiple text subcomponents that define an associated text component and thereby defining a hierarchy of text components that characterize text that is displayed on the computer display; and
    b) selecting text that appears on the computer display to highlight that text and simultaneously displaying the text components and text subcomponents associated with the highlighted text on a separate region of the computer display.

14. The method of claim 13 comprising the additional step of modifying the text components or text subcomponents of the highlighted text that is displayed on the computer display and causing an appearance of the highlighted text to be changed on the display to reflect the modified text component or subcomponent.

15. The computer apparatus of claim 14 wherein the processor controls a depiction of a graphic image on a portion of the computer display representing components and subcomponents of a paint tool within a separate region spaced from an image region of the computer display and wherein the graphic image is a hierarchical structure having component and subcomponent objects.

16. The computer graphics rendering apparatus of claim 15 wherein the processor saves paint tool components and subcomponents in the storage means and further wherein the processor extracts selected ones of the saved paint tool components and subcomponents for use in defining a paint tool used in painting to the computer display.

17. Computer apparatus for presenting an image on a viewing screen comprising:
   a) processor means for defining a custom paint tool for use in rendering images on the computer display by organizing the paint tool as a plurality of paint tool components that define a manner in which a tool paints an image on the computer display wherein at least some of the paint tool components are made up of multiple paint tool subcomponents that define an associated tool component and thereby defining a hierarchy of components that characterize the paint tool;
   b) storage means operatively coupled to the processor means for storing data that characterizes the paint tool components and paint tool subcomponents for a plurality of paint tools within a memory store for retrieval and use in rendering images; and
   c) a computer display coupled to the processor means for presenting a graphics image on a viewing screen;
   d) wherein said processor means periodically retrieves from the storage means data to define at least part of a paint tool for rendering images on the computer display.

18. The computer apparatus of 17 additionally comprising an input device for selecting an object on the computer display and wherein the processor displays at least some of the components and subcomponents that define an appearance of the selected object on the computer display.

19. The computer apparatus of claim 17 wherein the processor comprises an input device for modifying the attributes of the selected object for use in subsequent rendering of images on the computer display.

20. Computer graphics rendering apparatus for presenting an image comprising:
   a) a display monitor comprising means for rendering a color image on a display screen of the display monitor by activating picture elements that combine to define the color image;
   b) drive circuitry coupled to the display monitor for supplying video display signals for rendering images on the display monitor;
   c) a processor executing a stored program for creating the video display signals coupled to the drive circuitry to implement a style object for use in rendering images on the display monitor; said stored program defining a data structure for storing data attributes of a paint tool for use in rendering text or brush strokes on the display monitor;
   d) a computer memory for storing data attributes of a plurality of paint tools for retrieval of the data attributes; and
   e) said stored program presenting a user interface on the display monitor that allows the user to retrieve from the computer memory the data attributes of a particular custom paint tool or data attributes of components or subcomponents and using the retrieved data attributes for painting an image.

21. A method for rendering images on a computer display comprising the steps of:
   a) defining one or more image rendering tools as a plurality of tool components that define a manner in which a rendering tool paints an image on the computer display wherein at least some of the tool components are made up of multiple tool subcomponents that define an associated tool component and thereby define a multiple level hierarchy of tools, components and subcomponents that characterize the one or more image rendering tools;
   b) storing characterizing data for a plurality of image rendering tools, tool components and tool subcomponents on a memory store for selective retrieval of various combinations of the stored rendering tools, stored tool components and stored tool subcomponents;
   c) periodically retrieving from the memory store a selected combination of stored rendering tools, tool components and tool subcomponents to define an active rendering tool for subsequent image rendering on the display screen;
   d) displaying a hierarchical arrangement of components and subcomponents for an active rendering tool on the computer display; and
   e) with the aid of an input pointing device allowing a user to select an object within an image display region of the computer display and updating the display of the hierarchical arrangement of the tool rendering components or subcomponents that made up the rendering tool used to paint the selected object onto the image display region.

* * * * *